United States Patent
Khare et al.

(10) Patent No.: US 11,864,116 B2
(45) Date of Patent: Jan. 2, 2024

(54) SYSTEM AND METHOD FOR SAVING MOBILE BATTERY AND EMPOWERING USER EQUIPMENT FOR INCOMING COMMUNICATION AND PAGING

(71) Applicant: Nokia Technologies Oy, Espoo (FI)

(72) Inventors: Saurabh Khare, Bangalore (IN); Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/279,438

(22) PCT Filed: Sep. 25, 2018

(86) PCT No.: PCT/US2018/052636
§ 371 (c)(1),
(2) Date: Mar. 24, 2021

(87) PCT Pub. No.: WO2020/068049
PCT Pub. Date: Apr. 2, 2020

(65) Prior Publication Data
US 2021/0410071 A1    Dec. 30, 2021

(51) Int. Cl.
*H04W 52/02* (2009.01)
*H04W 68/02* (2009.01)

(52) U.S. Cl.
CPC ....... *H04W 52/0258* (2013.01); *H04W 68/02* (2013.01)

(58) Field of Classification Search
CPC ... H04W 52/0258; H04W 68/02; Y02D 30/70
USPC .................................. 370/331; 455/458, 515
See application file for complete search history.

(56) References Cited

U.S. PATENT DOCUMENTS

| 2005/0020249 A1 | 1/2005 | Seo |
| 2010/0124223 A1 | 5/2010 | Gibbs et al. |

(Continued)

FOREIGN PATENT DOCUMENTS

| EP | 2992713 A1 | 3/2016 |
| KR | 20030097373 A | 12/2003 |
| WO | 2014/177184 A1 | 11/2014 |
| WO | 2018/008980 A1 | 1/2018 |

OTHER PUBLICATIONS

"3rd Generation Partnership Project; Technical Specification Group Services and System Aspects; System Architecture for the 5G System;Stage 2 (Release 15)", 3GPP TS 23.501, V15.2.0, Jun. 2018, pp. 1-217.

(Continued)

*Primary Examiner* — Michael Y Mapa
(74) *Attorney, Agent, or Firm* — ALSTON & BIRD LLP

(57) ABSTRACT

A system and method for saving mobile battery and empowering user equipment for controlling incoming communication and paging are provided. Also provided are a system and method for determining whether a mobile a device is in an idle mode, and in response to receiving an incoming communication from a service, determining whether the service associated with the incoming communication is on a reject list of services or a preferred list of services. The system performs a first action specified by a determination that the service is on the reject list of services or the service is not on the preferred list of services, and performs a second action specified by a determination that the service is on the preferred list of services. The first action differs from the second action.

18 Claims, 5 Drawing Sheets

(56) References Cited

U.S. PATENT DOCUMENTS

| | | | |
|---|---|---|---|
| 2010/0216434 A1* | 8/2010 | Marcellino | H04W 4/20 |
| | | | 455/412.2 |
| 2011/0310804 A1 | 12/2011 | Beygzadeh | |
| 2012/0264443 A1* | 10/2012 | Ng | H04W 60/04 |
| | | | 455/450 |
| 2013/0170438 A1 | 7/2013 | Nishida et al. | |
| 2015/0201400 A1* | 7/2015 | Yin | H04W 28/0252 |
| | | | 370/329 |
| 2016/0044157 A1 | 2/2016 | Chen et al. | |
| 2017/0272568 A1 | 9/2017 | Bovis | |

OTHER PUBLICATIONS

"3rd Generation Partnership Project; Technical Specification Group Services and System Aspects; Procedures for the 5G System; Stage 2(Release 15)", 3GPP TS 23.502, V15.2.0, Jun. 2018, pp. 1-308.

"Enhancements to Dual Registration Mode of Operation", SA WG2 Meeting #128, S2-186370, Agenda : 7.1, Intel, Jul. 2-6, 2018, pp. 1-3.

"5G; Non-access-stratum (NAS) Protocol for 5G System (5GS); Stage 3 (3GPP TS 24.501 Version 15.0.0 Release 15)", ETSI TS 124 501, V15.0.0, Jul. 2018, 337 pages.

International Search Report and Written Opinion received for corresponding Patent Cooperation Treaty Application No. PCT/US2018/052636, dated May 29, 2019, 13 pages.

Office Action for European Application No. 18793306.4 dated Mar. 24, 2023, 6 pages.

\* cited by examiner

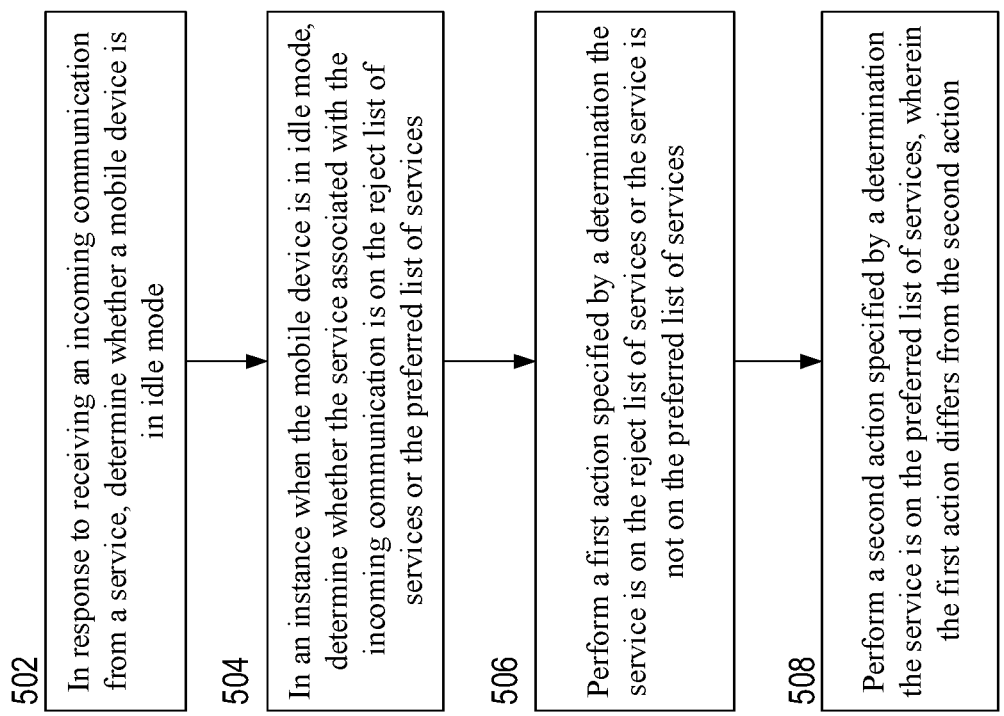

SYSTEM AND METHOD FOR SAVING MOBILE BATTERY AND EMPOWERING USER EQUIPMENT FOR INCOMING COMMUNICATION AND PAGING

RELATED APPLICATION

This application claims priority to PCT Application No. PCT/US2018/052636, filed on Sep. 25, 2018, which is incorporated herein by reference in its entirety.

TECHNOLOGICAL FIELD

An example embodiment of the present disclosure relates generally to wireless communications technology and, more particularly, relate to a system, method, computer program product, and apparatus for saving mobile battery and empowering user equipment for incoming communication and paging.

BACKGROUND

Services provided by the wireless communication network has increased in recent years. These services include specific Data Network Name (DNN), specific Single Network Slice Selection Assistance Information (S-NSSAI), incoming calls, Short Message Service (SMS), etc. Along with the expansion of services and improvement of wireless communication networks, mobile electronic devices used for wireless communication have also been continually improving. Due to the now ubiquitous nature of mobile electronic devices, people of all ages and education levels are utilizing mobile terminals to communicate with other individuals or contacts, receive services and/or share information, media and other content.

With the proliferation of mobile terminals, and given the variety of services beyond just placing phone calls that can be accomplished with mobile terminals, many individuals are finding mobile terminals to be important parts of their work and social lives. Thus, being able to rely upon the availability of the mobile terminal is an important consideration for many users. However, since mobile terminals run on battery power, and since the number of scenarios associated with the variety of services can often trigger the mobile terminal to switch from "idle mode" to "connected mode", battery conservation is a constant concern for mobile terminal users and therefore balancing utility with power consumption becomes an issue. In this regard, for example, if a user is waiting for a specific email, call, or an alert from a certain application (e.g., mapped to a specific DNN or several DNNs) and is equipped with a mobile terminal having a low battery such as less than 5%, the user would almost certainly like to have more battery power available since the mobile terminal has moved to a "connected mode" and may be open to receiving incoming communications/paging from the variety of services and the network.

Accordingly, it may be desirable to provide a mechanism by which battery power may be conserved.

BRIEF SUMMARY

A system, method, computer program product, and apparatus are therefore provided that may save mobile battery power and empower user equipment in controlling incoming communications and paging. In particular, user equipment in a radio network is paged for subscribed/opted services such as for example, different DNNs, slices, terminating video/video calls, terminating SMS, etc. Accordingly, for example, user equipment (e.g., mobile devices) rapidly consumes battery power in situations in which the user equipment is paged for all of these services. In the context of a system, the system includes a mobile device configured to transmit, via a first Non-Access Stratum (NAS) message, an information element comprising information related to a reject list of services or a preferred list of services to a network node through a radio access network. The system also includes a network node to which the network node is configured, in response to receiving an incoming communication from a service, to determine whether the mobile device is in idle mode. The network node is further configured to in an instance when the mobile device is in the idle mode, determine whether the service associated with the incoming communication is on the reject list of services or the preferred list of services. The network node is then configured to perform a first action specified by a determination the service is on the reject list of services or the service is not on the preferred list of services and perform a second action specified by a determination the service is on the preferred list of services, wherein the first action differs from the second action.

In another example embodiment, an apparatus for controlling incoming communication activity is provided. The apparatus may include at least one processor and at least one memory storing computer program code with the at least one memory and stored computer program code being configured, with the at least one processor, to cause the apparatus to at least in response to receiving an incoming communication from a service, determine whether a mobile device is in idle mode and in an instance when the mobile device is in idle mode, determine whether the service associated with the incoming communication is on a reject list of services or a preferred list of services. The apparatus is further configured to perform a first action specified by a determination that the service is on the reject list of services or the service is not on the preferred list of services and perform a second action specified by a determination that the service is on the preferred list of services, wherein the first action differs from the second action.

Also provided is a method for determining whether a mobile a device is in idle mode, and in response to receiving an incoming communication from a service, determining whether the service associated with the incoming communication is on a reject list of services or a preferred list of services. The method also comprises performing a first action specified by a determination that the service is on the reject list of services or the service is not on the preferred list of services, and performing a second action specified by a determination that the service is on the preferred list of services, wherein the first action differs from the second action.

Further, an apparatus is provided in accordance with another example embodiment that includes means for determining whether a mobile a device is in idle mode, and means for determining, in response to receiving an incoming communication from a service, whether the service associated with the incoming communication is on a reject list of services or a preferred list of services. The apparatus also comprises means for performing a first action specified by a determination that the service is on the reject list of services or the service is not on the preferred list of services, and means for performing a second action specified by a determination that the service is on the preferred list of services, wherein the first action differs from the second action.

Additionally, a computer program product is provided in accordance with another example embodiment that includes means for determining whether a mobile a device is in idle mode, and means for determining, in response to receiving an incoming communication from a service, whether the service associated with the incoming communication is on a reject list of services or a preferred list of services. The computer program product also comprises means for performing a first action specified by a determination that the service is on the reject list of services or the service is not on the preferred list of services, and means for performing a second action specified by a determination that the service is on the preferred list of services, wherein the first action differs from the second action.

BRIEF DESCRIPTION OF THE DRAWINGS

Figure 1:
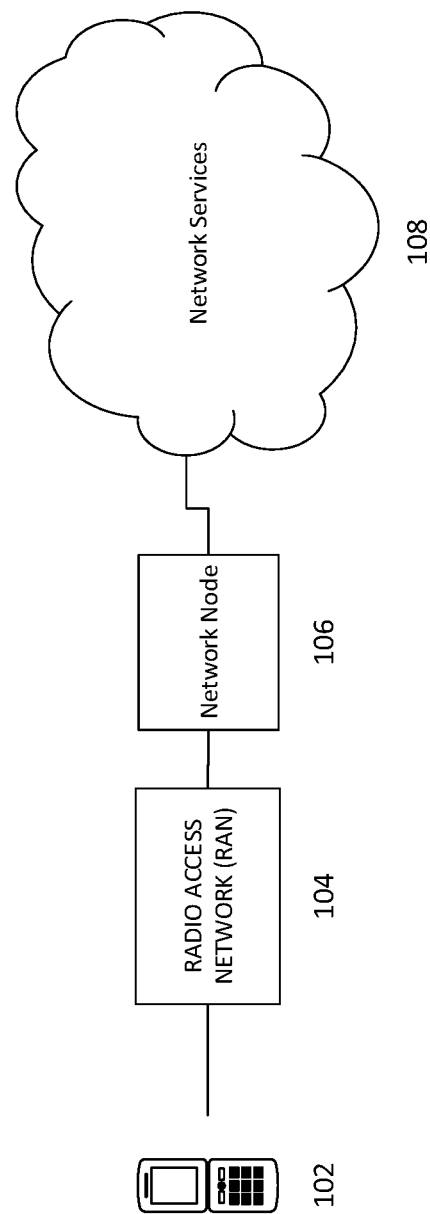
Figure 2:
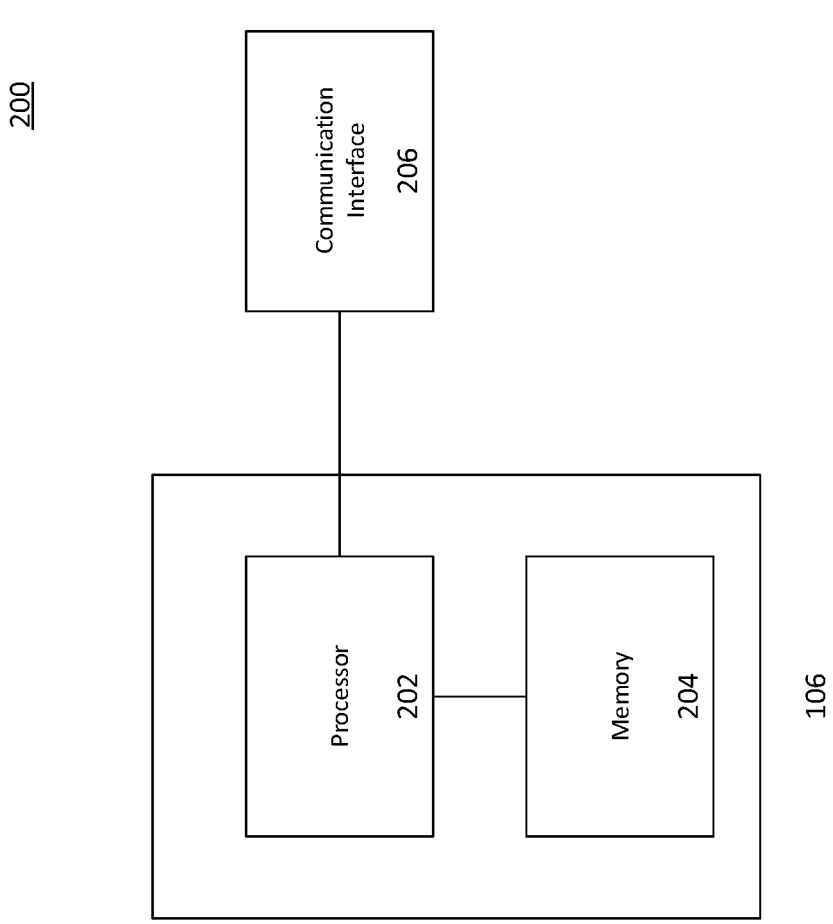
Figure 3:
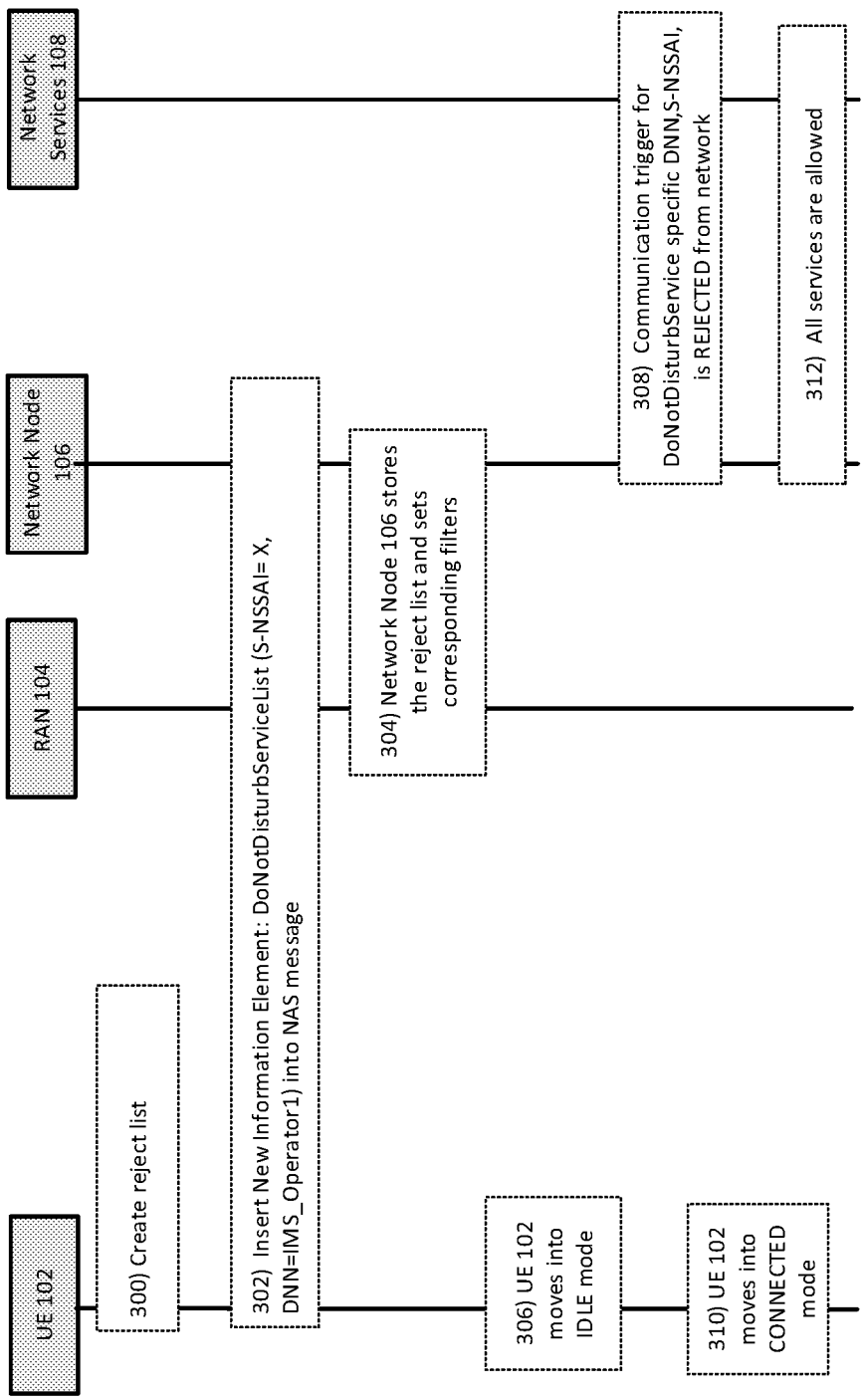
Figure 4:
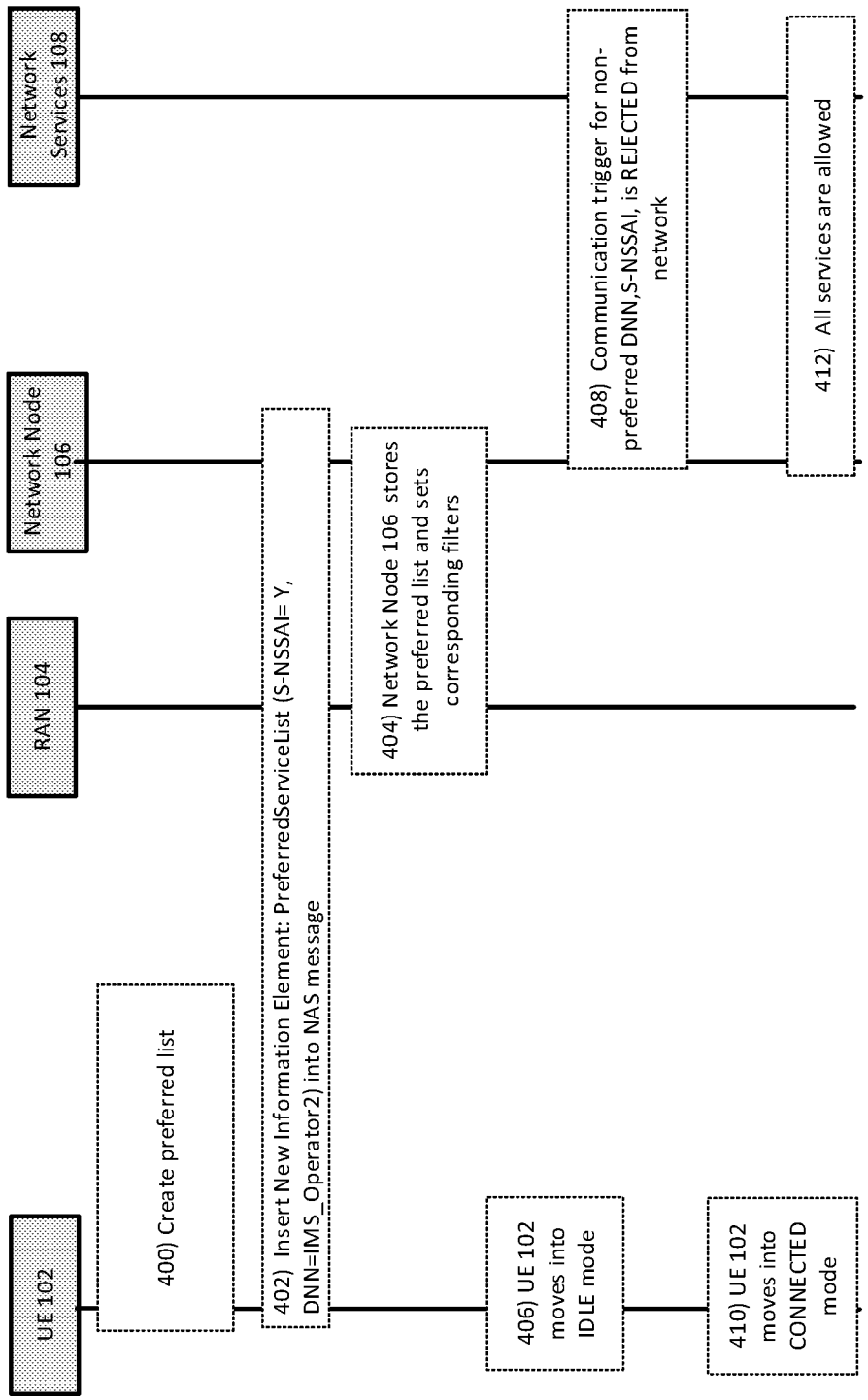

Having thus described certain example embodiments of the present disclosure in general terms, reference will now be made to the accompanying drawings, which are not necessarily drawn to scale, and wherein:

FIG. 1 is an overview of a system that can be used to practice an example embodiment of the present disclosure;

FIG. 2 illustrates an example block diagram of a device that may be specifically configured in accordance with an example embodiment;

FIGS. 3 and 4 illustrate example sequence diagrams illustrating operations performed in accordance with an example embodiment of the present disclosure; and FIG. 5 illustrates a flowchart illustrating operations performed to control communications and paging to a user equipment in accordance with an example embodiment.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present.

This definition of 'circuitry' applies to all uses of this term herein, including in any claims. As a further example, as used herein, the term 'circuitry' also includes an implementation comprising one or more processors and/or portion(s) thereof and accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device. As defined herein, a "computer-readable storage medium," which refers to a physical storage medium (e.g., volatile or non-volatile memory device), may be differentiated from a "computer-readable transmission medium," which refers to an electromagnetic signal.

Some embodiments of the present invention may provide a mechanism by which improvements may be experienced in relation to incoming communications/paging that may provide conservation of battery power for mobile terminals. In this regard, for example, rather than the mobile terminal being paged for multiple services, an example embodiment empowers the mobile terminal to select specific services (e.g., DNN, S-NSSAI, voice, or SMS) for which the mobile terminal wants to be paged and/or to select services for which the mobile terminal does not want to be paged. The selection or listing of services may be determined by the mobile terminal or by a network entity serving the mobile terminal.

A system, method, computer program product, and apparatus are therefore provided for facilitating user equipment (UE) to configure a preference (e.g., a list) of services in a network for which it wants to be paged or does not want to be paged. These services include DNN, S-NSSAI, any incoming call, SMS, etc. In a CONNECTED state, the UE temporarily configures any of these specific services as "the only list of services for paging". Alternatively, the UE configures any of these specific services in "the do not be disturbed (with paging) service list". The UE uses any available Non-Access Stratum (NAS) messages (e.g., Registration Accept, Service Accept, etc.) to define and/or activate the preference on the network. The network stores the activated list and when the UE is in IDLE state, the network pages only for the services that the UE wants to be paged and it does not page the UE for the services mentioned in the "do not disturb service list" or otherwise not included in the activated list.

Although the system, method, computer program product, and apparatus may be implemented in a variety of different systems, one example of such a system is shown in FIG. 1. FIG. 1 is a networked system 100 in accordance with an example embodiment of the present disclosure. FIG. 1 specifically illustrates User Equipment (UE) 102 (e.g., mobile terminal), which may be in communication with a Radio Access Network (RAN) 104 in order to access a network node 106. The network node 106 may, in turn, be in communication with network services 108. In some example embodiments, network node 106 may, for example, be embodied as various network functions including, for example, Access and Mobility Management Function (AMF), Session Management function (SMF), Unified Data Management (UDM), or some combination thereof. While the system may be implemented in Fifth Generation (5G) wireless networks that include one or more RANs, other networks may support the system, method, computer program product, and apparatus of some embodiments of the present invention.

In example embodiments, the UE 102 may be a mobile communication device such as, for example, a personal digital assistant (PDA), wireless telephone, mobile computing device, camera, video recorder, audio/video player, positioning device, game device, television device, radio device, or various other like devices or combinations thereof. Furthermore, although not shown in FIG. 1, the UE 102 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), Wi-Fi, ultra-wide band (UWB), Wibree techniques and/or the like. As such, the UE 102 may be enabled to communicate with a network and/or with other terminals by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In some examples, the network node 106 stores the lists created by UE 102. The lists may include a do not disturb list of services (also referenced as a reject list of services) for blocking communications or mobile terminated (MT) transactions to UE 102. A preferred list of services may also be implemented for only allowing communications from the preferred list to be sent to UE 102. Services not from the preferred list will be rejected by network node 106. With respect to the do not disturb list, for example, when UE 102 is in IDLE mode and when the network node 106 receives an initial message associated with a service on the "do not disturb list", the network node 106 should reject the message and not page UE 102. In other words, only services identified on the "do not disturb list" will be rejected, and any communications related to services not on the "do not disturb list" will be allowed/paged. Additionally or alternatively, with respect to the preferred list, when the UE 102 is in IDLE mode and the network node 106 receives an initial message associated with a service that is on the "preferred list of services," the network node 106 will allow the communication and page the UE 102 so that the UE 102 is in CONNECTED mode. Should the message be associated with a service not from the "preferred list of services," then the network node 106 of this example embodiment rejects the message and does not page UE 102 so that the UE 102 remains in IDLE mode.

In some examples, only one of the "do not disturb list" or the "preferred list" may be configured. In this case, only one of the lists will be active, either the "do not disturb list" or the "preferred list." In some examples, both the "do not disturb list" and the "preferred list" may be configured. In some examples, both lists may be configured and activated at the same time. In this case, the network node is configured to consider both the "do not disturb list" and the "the preferred list" when determining to allow the communication service. For example, the network node is configured to allow the communication service when the service is not in the "do not disturb list" and the communication service is in the "preferred list."

In some examples, the UE 102 is configured to transmit, via a first NAS message, an information element comprising information related to the reject list of services or the preferred list of services to the network node 106 through a radio access network. The information element may further include an activation flag which may be set by the UE 102. The activation flag indicates whether or not to activate the reject list of services or the preferred list of services. For example, the information element contains attributes comprising a specific DNN, or any specific S-NSSAI, IP@, AppName, etc. The information element may also contain the activation/enabler flag for SMS service (to disable voice or SMS (mobile terminal) service). UE 102 can activate or deactivate the lists any number of times via NAS messaging, however, the lists will only be applied, even when activated, when UE 102 is in IDLE mode. When the UE 102 is in IDLE mode, the UE 102 is "camped" in a cell of the network and the UE 102 can receive information from the network. For example, for calls originated by the UE 102, the call is begun in the corresponding control channel, from the cell on which the UE is camped. In the case of terminated calls, the network previously knows location information associated with the UE, and in which registration area the UE is located, and then sends a "paging" message for the UE 102 in the control channel(s) of this registration area, which the UE 102 can answer. Without the lists provided by an example embodiment of the present disclosure, the UE may be paged for all subscribed/opted services. When UE 102 is in IDLE mode, the paging performed in accordance with these different scenarios causes to the UE 102 to switch into CONNECTED mode which is one of the main reasons for battery drain issues.

In some examples, the network node 104 contains mechanisms for controlling communications and paging according to the lists created by the UE 102. The network node 104 is configured to receive the reject list of services or the preferred list of services via the NAS message from the UE 102 and store the lists for future reference. When an incoming communication from a service is received, the network node 104 determines whether the UE 102 is in IDLE mode. Only when the UE 102 is in IDLE mode, will the network node proceed with filter operations to determine whether the service associated with the incoming communication is on the reject list of services or the preferred list of services. The network node checks if the service is from the reject list of services or the preferred list of services. Thereafter, the network node performs a first action specified by a determination that the service is on the reject list of services or the service is not on the preferred list of services. The network node alternatively performs a second action specified by a determination that the service is on the preferred list of services. The first action differs from the second action. The first action comprises rejecting the incoming communication and not paging the mobile device in idle mode. The second action comprises permitting the incoming communication and paging the mobile device causing the mobile device to enter connected mode. In the case where the UE is in CONNECTED mode, the network node is configured to suppress operations related to the lists and permit all services to be performed.

Turning now to FIG. 2, examples of a network node apparatus (including network node 106) may be embodied as a core network apparatus as configured in accordance with an example embodiment of the present disclosure. As described below, the network node 106 of an example embodiment may be configured to perform the functions described herein. In any instance, the network node 106 may more generally be embodied by a computing device, such as a server, a personal computer, a computer workstation or other type of computing device including those functioning as a user equipment and/or a wireless local area network. Regardless of the manner in which the network node 106 is embodied, the apparatus of an example embodiment may be configured as shown in FIG. 2 so as to include, be associated with or otherwise be in communication with processing circuitry 200 including, for example, a processor 202 and a memory 204 and, in some embodiments, and/or a communication interface 206.

In the processing circuitry 200, the processor 202 (and/or co-processors or any other circuitry assisting or otherwise associated with the processor) may be in communication with the memory device 204 via a bus for passing information among components of the network node 106. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The network node 106 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multi-threading.

In an example embodiment, the processor 202 may be configured to execute instructions stored in the memory device 204 or otherwise accessible to the processor. Alternatively or additionally, the processor may be configured to execute hard coded functionality As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an encoder and/or a decoder) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In embodiments that include a communication interface 206, the communication interface may be any means such as a device or circuitry embodied in either hardware or a combination of hardware and software that is configured to receive and/or transmit data from/to a network and/or any other device or module in communication with the network node 104, such as UE, core network services, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 3, the operations performed, such as by UE 102, RAN 104, network node 106 and network services 108, to control incoming communications/paging to the UE 102 are depicted. As shown in 300, UE 102 is associated with and, in some embodiments, creates a reject list, also referenced as a do not disturb list, to block incoming communications/paging from specific services (e.g., internet-DNN, voice service or SMS services, or a certain list of S-NSSAI based communications) to the UE 102 while the UE is in IDLE mode. For example, the UE 102 may have only a small amount of battery power, for example, less than 20% such that the UE 102 may not want to be paged for all services and conserve battery power.

Regardless of the manner in which the reject list or the do not disturb list of services is created, the UE 102 shares the list with RAN 104 and network node 106, such as via Non Access Stratum (NAS) signaling (302). For example, the UE 102 may use any available NAS message (e.g., Registration Accept, Service Accept, and the like) to add a new information element comprising the reject list ("DoNotDisturbServiceList"). In some examples, the information element includes an enabler flag for SMS service. The enabler flag indicates whether to disable voice or SMS service.

As shown in 304, the network node 106 stores the list and sets corresponding filters to activate operations related to the do not disturb service list such as implementing additional checks whether an incoming communication is associated with a service on the do not disturb list. In other words, the network node is configured to determine a manner in which to handle paging or alerting of a terminating communication at the UE 102. A terminating communication, according to an example embodiment, is a communication or mobile terminated (MT) transaction being terminated on the UE 102. For example, the MT message/transaction or terminating communication is a message or communication sent to the UE 102. The terms MT transaction, MT message, terminating communication, incoming communication and similar terms may be used interchangeably, according to some example embodiments, to refer to information data transmitted to the UE 102.

In some example embodiments, the network node 106 is configured to apply a "do not disturb" filter (e.g., DNN="internet") such that if a terminating communication is related to a service configured in the "do not disturb" list, then the terminating communication is blocked (filtered). Conversely, if the service is not in the "do not disturb" list, then the service is allowed. In an instance when the UE 102 moves into IDLE mode such as when no activity is occurring, the do not disturb service list is activated (306) (since the do not disturb service list is not activated while in the CONNECTED mode). The UE 102 can activate or deactivate the do not disturb service list any number of times. For any incoming communication, the network node checks if the UE 102 is in the IDLE mode and in response to the network node being in the IDLE mode, the network node rejects the communication in an instance in which the communication is associated with a service on the do not disturb list as shown by 308. As such, the network node does not send a paging message to the UE 102. In other words, if the service is on the do not disturb service list, the communication trigger from the service is rejected. As such, the UE 102 is not paged and battery power of the UE 102 is not consumed. In some examples, the network node 106 is configured to allow any MT message/transaction not on the do not disturb list. In these examples, the UE 102 is paged by the network node.

In an instance when the UE 102 moves into CONNECTED mode (310), such as for example, when the UE 102 makes or receives a voice call, or makes or receives a data call, the network node 106 will suppress the do not disturb list (e.g., do not apply "do not disturb filter") so that all services are allowed (312).

FIG. 4 includes similar operations performed by FIG. 3, however, as shown in 400, UE 102 creates or is otherwise associated with a preferred services list to only allow communications/paging from specific services (e.g., internet-DNN, voice service or SMS services, or a certain list of S-NSSAI based communications) to the UE 102 while the UE is in IDLE mode. In this case, communications received from services not on the preferred list will not disturb UE 102 in that paging of the UE will be suppressed and will not be performed. As shown in 402, an information element comprising the "PreferredServiceList" is inserted into a message, such as an NAS message. In response, the network node 106 stores the preferred list and sets corresponding filters to invoke additional checks to confirm whether or not a service is on the preferred services list (404). Therefore, when the UE 102 is in the IDLE mode (406) and a terminating communication is received, the network node checks if the terminating communication is associated with a service on the preferred services list. If the service is on the preferred services list, the network node allows the communication and will page UE 102. Alternatively, if the service is not from the preferred services list, then the network node rejects the communication and will not page UE 102 (408). In an instance the UE moves into CONNECTED mode (410), all terminating services are allowed (412).

The aforementioned sequence of operations provides for automated configuration of the network node to control communications on behalf of the UE 102 according to the lists created by or otherwise associated with the UE 102. In this case, the UE 102 is empowered to control which services may disturb the UE 102. For example, instead of repeatedly paging the UE 102 for every service, the UE 102 may set a do not disturb list of services or a preferred list of services to which the network node 104 is configured to check whether a service is on the do not disturb list or the preferred list and take action accordingly.

Another notable benefit is that the UE 102's battery consumption is reduced with the implementation of said lists. The network node 104 rejects any communications on the do not disturb list or not on the preferred list; and/or allows communication from services on the preferred list. Additionally or alternatively, the UE 102 may be configured with a predetermined list. In some embodiments, the UE 102 is configured to manually accept or edit a predetermined list via a user interface of UE 102.

In some examples, in an instance when the UE 102 is in the IDLE state, and a service request or MT transaction is to be made, the network node 106 may be configured to determine whether the UE 102's battery power fails to satisfy a predefined threshold (e.g., 50%). If it fails to satisfy the threshold (by being less than the threshold), the network node is configured to apply the preference list(s) and prevent paging as described herein. If, however, the UE 102 has battery power satisfying the predefined threshold (by meeting or being greater than the threshold), the network node is configured not to apply the preference list(s) and skips the disclosed filtering process and permits paging. Additionally or alternatively, the network node 106 may not consider or determine the UE 102's battery power when applying the filtering process according to the preference list(s). The process of battery power comparison may be "turned on" or activated as a value/flag set by the UE 102 and included as part of the information element of the NAS message.

Turning now to FIG. 5, a series of operations is illustrated that may be performed by an apparatus in controlling communications to UE 102. In the following example, the apparatus is embodied by the network node 104, but, in other embodiments, the apparatus may be embodied by other devices, such as UE 102. The network node 104 may be embodied by processing circuitry 200, such as shown in FIG. 2. Processing circuitry 200 may as discussed above include means, such as a processor 202, memory 204, and/or communication interface 206 for executing the operations described in connection with FIG. 5.

In some examples, in response to receiving an incoming communication from a service, the network node 104 may include means, such as the processing circuitry 200, the processor 202 or the like, configured to determine whether a mobile device/UE 102 is in an IDLE mode (block 502). As previously mentioned above, the network node 104 is configured to invoke operations related to the reject list/do not disturb list or the preferred list only when the mobile device/UE 102 is in IDLE mode. In an instance when the mobile device is in IDLE mode, the network node 104 may include means, such as the processing circuitry 200, the processor 202 or the like, configured to determine whether the service associated with the incoming communication is on the reject list of services or the preferred list of services (block 504). That is, the network node 104 may check if the communication is from a service on the reject list or the preferred list.

The network node 104 also includes means, such as the processing circuitry 200, the processor 202 or the like, configured to perform a first action specified by a determination that the service is on the reject list of services or the service is not on the preferred list of services (block 506). For example, the first action may be rejecting the incoming communication and not paging the mobile device in IDLE mode. Additionally or alternatively, network node 104 includes means, such as the processing circuitry 200, the processor 202 or the like, configured to perform a second action specified by a determination the service is on the preferred list of services with the first action differing from the second action (block 508). The second action may include permitting the incoming communication and paging the mobile device causing the mobile device to enter connected mode.

In another embodiment, the network node 104 may include means, such as the processing circuitry 200, the processor 202 or the like, configured to determine that the mobile device is in CONNECTED mode, and in response to the determination, may include means, such as the processing circuitry 200, the processor 202 or the like, configured to suppress operations related to the reject list of services or the preferred list of services and permit the incoming communication. For example, when the mobile device/UE 102 is in CONNECTED mode, the reject list/do not disturb list of services and the preferred list of services are not activated. The lists may be activated once the mobile device is in IDLE mode. The mobile device may activate or deactivate said lists at any time via network signaling, such as NAS messaging, by setting an activation flag. The activation flag indicates whether or not to activate the lists. In some examples, the network node 104 includes means, such as the processing circuitry 200, the processor 202, the memory 204 or the like, configured to store the reject list of services and/or preferred list of services in memory 204. In another embodiment, the network node may include means, such as the processing circuitry 200, the processor 202 or the like, configured to determine that the mobile device is in IDLE mode, and in response to the determination, may include means, such as the processing circuitry 200, the processor 202 or the like, configured to determine whether the UE 102's battery power fails to satisfy a predefined threshold (e.g., 50%). If it fails to satisfy the threshold (by being less than the threshold), the network node is configured to process operations related to the reject list of services or the preferred list of services as described herein. If, however, the UE 102 has battery power satisfying the predefined threshold (by meeting or being greater than the threshold), the network node is configured not to apply or not implement operations related to the reject list of services or the preferred list of services and permit the incoming communication/paging.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included. Modifications, additions, or enhancements to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. An apparatus comprising at least one processor and at least one memory storing computer program code, wherein the at least one memory and stored computer program code are configured, with the at least one processor, to cause the apparatus to at least:

receive, at a network node, an activation flag, from a mobile device;

in response to receiving an incoming communication from a service, determine whether the mobile device is in an idle mode;

access, responsive to (i) a determination that the mobile device is in the idle mode, (ii) the activation flag indicating a first mode, and (iii) a battery power level of the mobile device failing to satisfy a threshold, a reject list of services and a preferred list of services and determine whether the service associated with the incoming communication is on the reject list of services or the preferred list of services;

perform a first action specified by a determination that the service is on the reject list of services or the service is not on the preferred list of services; and perform a second action specified by a determination the service is on the preferred list of services, wherein the first action differs from the second action, wherein, responsive to the activation flag indicating a second mode, the network node is configured to (i) suppress operations related to the reject list of services and the preferred list of services and (ii) permit all services to be performed.

2. The apparatus of claim 1, wherein the first action comprises rejecting the incoming communication and not paging the mobile device in the idle mode.

3. The apparatus of claim 1, wherein the second action comprises permitting the incoming communication and paging the mobile device so as to cause the mobile device to enter a connected mode.

4. The apparatus of claim 1, wherein the at least one memory and stored computer program code are further configured, with the at least one processor, to cause the apparatus to:

in response to determining that the mobile device is in a connected mode, suppress operations related to the reject list of services or the preferred list of services; and permit the incoming communication.

5. The apparatus of claim 1, wherein the service comprises at least one of: a Data Network Name (DNN) service, a specific Single Network Slice Selection Assistance Information (S-NSSAI) service, an incoming call, voice services, or Short Message Service (SMS).

6. The apparatus of claim 1, wherein the at least one memory and stored computer program code are further configured, with the at least one processor, to cause the apparatus to:

receive the reject list of services or the preferred list of services via a first Non- Access Stratum (NAS) message from the mobile device; and store the reject list of services or the preferred list of services.

7. A method comprising:

receiving, at a network node, an activation flag, from a mobile device;

in response to receiving an incoming communication from a service, determining whether the mobile device is in an idle mode;

accessing, responsive to (i) a determination that the mobile device is in the idle mode, (ii) the activation flag indicating a first mode, and (iii) a battery power level of the mobile device failing to satisfy a threshold, a reject list of services and a preferred list of services and determining whether the service associated with the incoming communication is on the reject list of services or the preferred list of services;

performing a first action specified by a determination that the service is on the reject list of services or the service is not on the preferred list of services; and performing a second action specified by a determination that the service is on the preferred list of services, wherein the first action differs from the second action, wherein, responsive to the activation flag indicating a second mode, the network node is configured to (i) suppress operations related to the reject list of services and the preferred list of services and (ii) permit all services to be performed.

8. The method of claim 7, wherein the first action comprises rejecting the incoming communication and not paging the mobile device in the idle mode.

9. The method of claim 7, wherein the second action comprises permitting the incoming communication and paging the mobile device causing the mobile device to enter a connected mode.

10. The method of claim 7, further comprising:

in response to determining the mobile device is in connected mode, suppressing operations related to the reject list of services or the preferred list of services; and permitting the incoming communication.

11. The method of claim 7, wherein the service comprises at least one of: a Data Network Name (DNN) service, a specific Single Network Slice Selection Assistance Information (S-NSSAI) service, an incoming call, voice services, or a Short Message Service (SMS).

12. The method of claim 7, further comprising:

receiving the reject list of services or the preferred list of services via a first Non-Access Stratum (NAS) message from the mobile device; and storing the reject list of services or the preferred list of services.

13. A computer program product comprising at least one computer readable non-transitory memory having program code instructions stored thereon, the program code instructions which when executed by an apparatus cause the apparatus to at least:

receive, at a network node, an activation flag, from a mobile device;

in response to receiving an incoming communication from a service, determine whether the mobile device is in an idle mode;

access, responsive to (i) a determination that the mobile device is in the idle mode, (ii) the activation flag indicating a first mode, and (iii) a battery power level of the mobile device failing to satisfy a threshold, a reject list of services and a preferred list of services and determine whether the service associated with the incoming communication is on the reject list of services or the preferred list of services;

perform a first action specified by a determination that the service is on the reject list of services or the service is not on the preferred list of services; and perform a second action specified by a determination that the service is on the preferred list of services, wherein the first action differs from the second action, wherein, responsive to the activation flag indicating a second mode, the network node is configured to (i) suppress operations related to the reject list of services and the preferred list of services and (ii) permit all services to be performed.

14. The computer program product of claim 13, wherein the first action comprises rejecting the incoming communication and not paging the mobile device in the idle mode.

15. The computer program product of claim 13, wherein the second action comprises permitting the incoming communication and paging the mobile device so as to cause the mobile device to enter a connected mode.

16. The computer program product of claim 13, further comprising program code instructions, which when executed by the apparatus further cause the apparatus at least to:

in response to determining that the mobile device is in a connected mode, suppress operations related to the reject list of services or the preferred list of services; and permit the incoming communication.

17. The computer program product of claim 13, wherein the service comprises at least one of: a Data Network Name (DNN) service, a specific Single Network Slice Selection Assistance Information (S-NSSAI) service, an incoming call, voice services, or Short Message Service (SMS).

18. The computer program product of claim 13, further comprising program code instructions, which when executed by the apparatus further cause the apparatus at least to:

receive the reject list of services or the preferred list of services via a first Non-Access Stratum (NAS) message from the mobile device, and store the reject list of services or the preferred list of services.

* * * * *